F. W. HALL.
MOLDING MACHINE.
APPLICATION FILED JUNE 22, 1907.
901,932.
Patented Oct. 20, 1908.
4 SHEETS—SHEET 1.
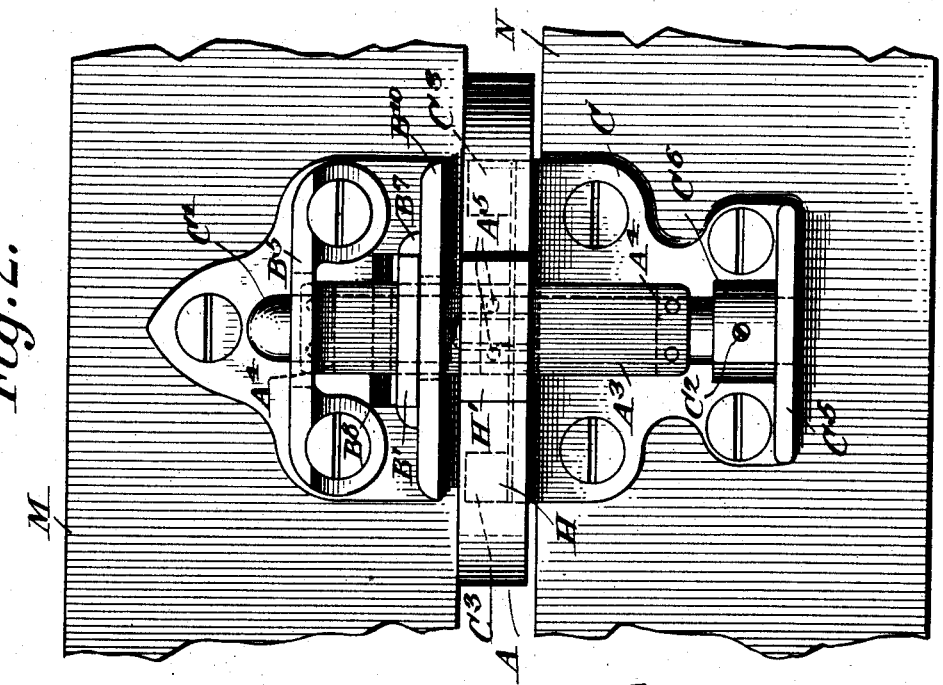
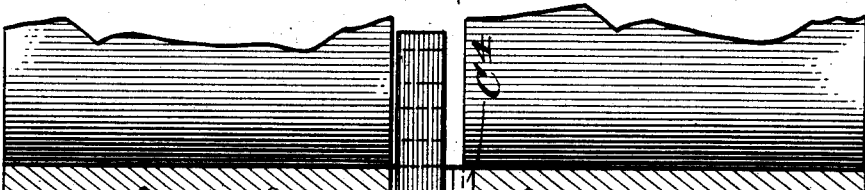
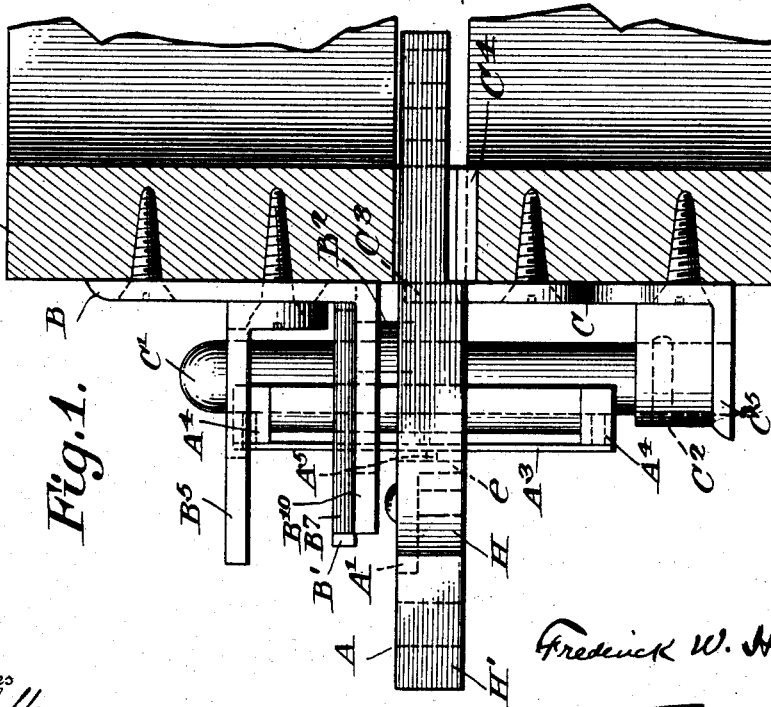

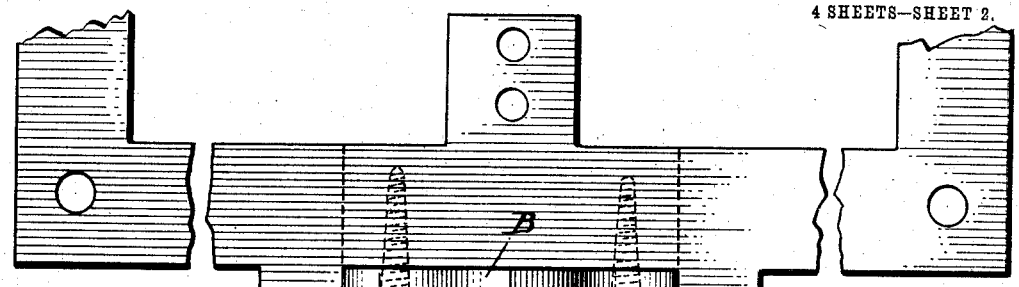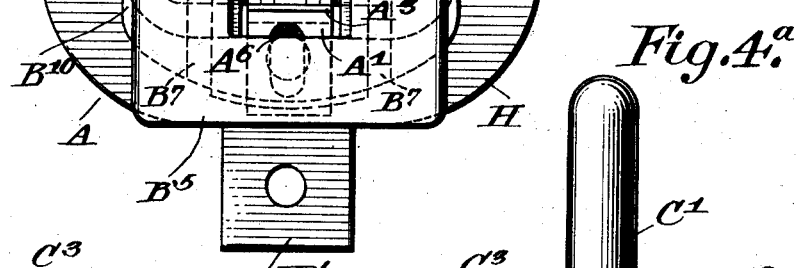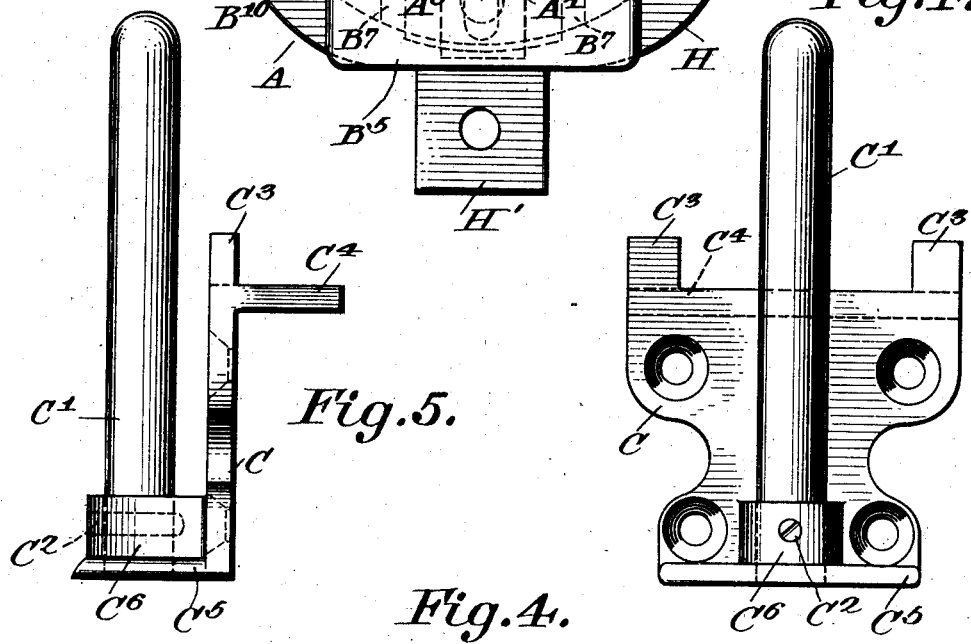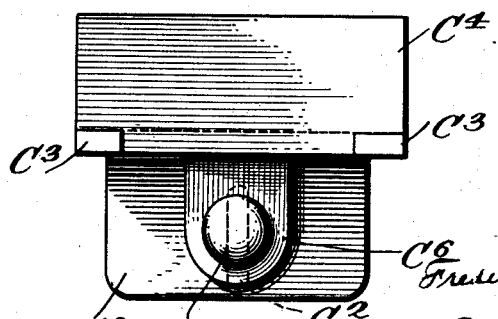

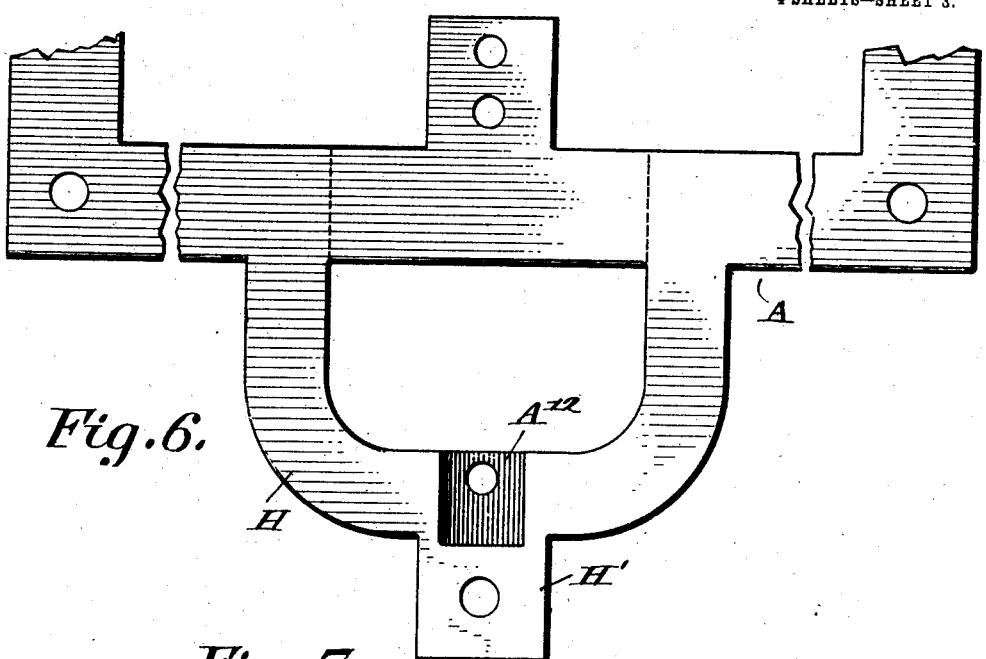
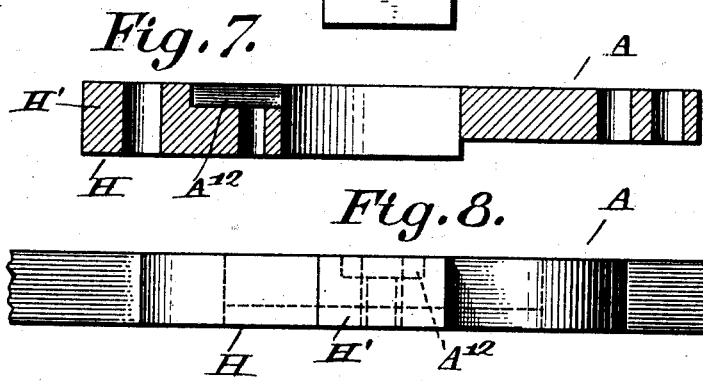
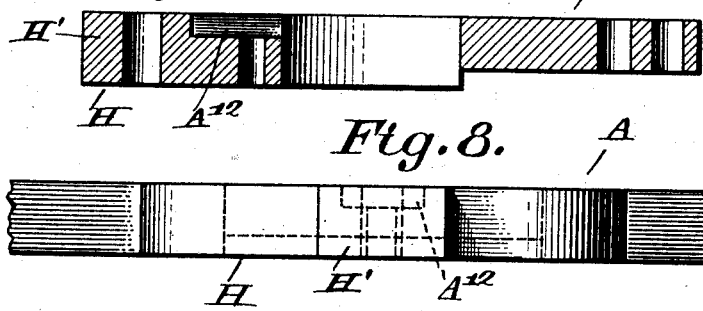
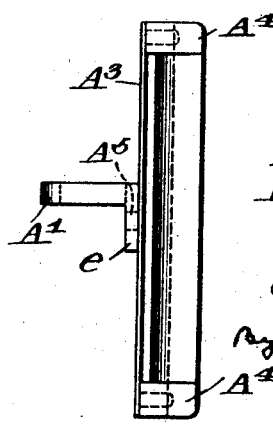

F. W. HALL.
MOLDING MACHINE.
APPLICATION FILED JUNE 22, 1907.
901,932.
Patented Oct. 20, 1908.
4 SHEETS—SHEET 4.
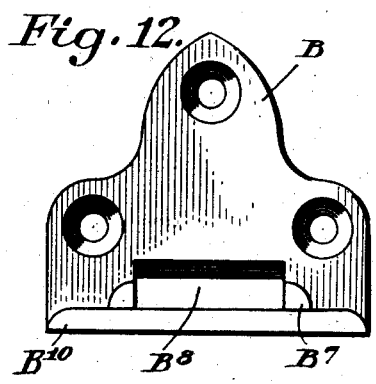
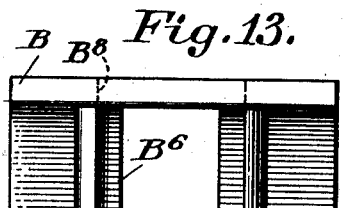
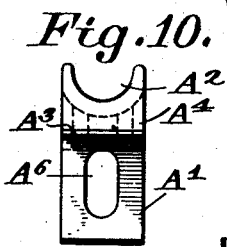
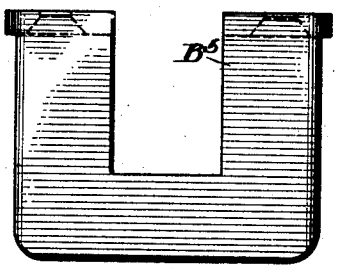
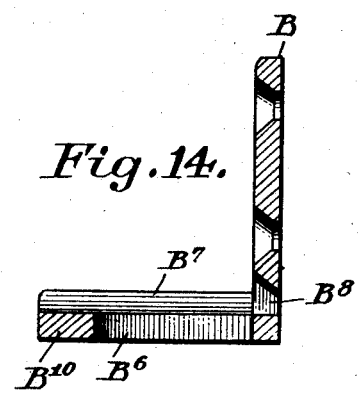
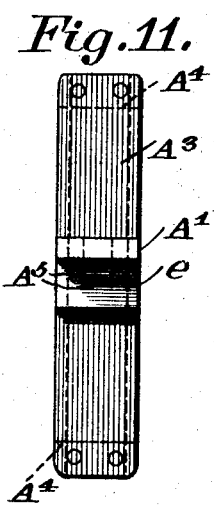
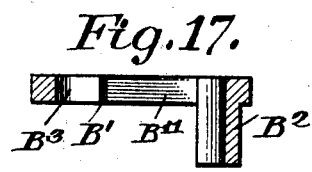
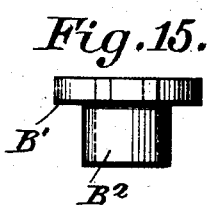
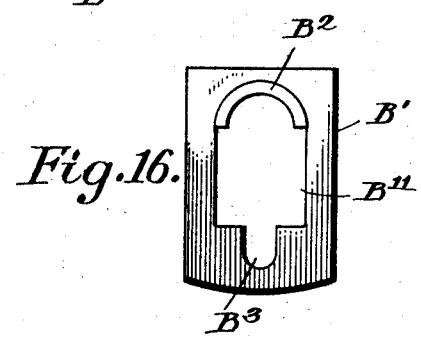
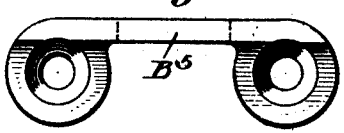

UNITED STATES PATENT OFFICE.

FREDERICK W. HALL, OF MERCHANTVILLE, NEW JERSEY, ASSIGNOR, BY DIRECT AND MESNE ASSIGNMENTS, TO J. W. PAXSON COMPANY, OF PHILADELPHIA, PENNSYLVANIA, A CORPORATION OF PENNSYLVANIA.

MOLDING-MACHINE.

No. 901,932.      Specification of Letters Patent.      Patented Oct. 20, 1908.

Original application filed December 28, 1906, Serial No. 349,762. Divided and this application filed June 22, 1907.
Serial No. 380,322.

*To all whom it may concern:*

Be it known that I, FREDERICK W. HALL, a citizen of the United States, residing at Merchantville, county of Camden, State of New Jersey, have invented certain new and useful Improvements in Molding-Machines, of which the following is a full, clear, and exact description, reference being had to the accompanying drawings, forming a part of this specification.

My invention relates generally to apparatus for forming sand molds for the production of metal castings, and, specifically, to the flask fittings used in such apparatus, especially when the latter are employed in a machine containing means for supporting the flask elements and the pattern-supporting frame and for ramming the sand in the flask, around the pattern, to form the mold, and for vibrating the pattern frame to release it from the sand mold.

This application is a division of my application filed Dec. 28, 1906, Serial No. 349,762, to which reference may be made for description, more in detail, of the pattern-holding frame, and of a preferred new character of such frame, invented by me.

The present invention hereinafter described, is confined to a novel construction of the flask fittings, and of novel combining means to unite the same in mechanical coaction, whereby the objects sought by me are accomplished, which are first to distribute the sand-ramming strain by the provision of means to make the pattern-frame more or less resilient or yielding relatively to the flask elements, under the impact blow; second, to produce a perfect sand-mold without the provision of any means independent of the flask elements and their fittings, to allow lateral movement of the pattern-frame relatively to the flask members during the rapping of the frame to release the pattern from the sand; and finally to readily and properly assemble and support the frame and the flask members in operative alinement and to enable the cope member to be guided to proper position relatively to the pattern-frame in lifting it on or off the same.

To these ends my invention consists of the elements and combinations of them hereinafter described.

Referring to the accompanying drawings, wherein similar letters of reference are used to indicate corresponding parts in each of the several views:—Figure 1 is a side elevation of the flask fittings, in position on the drag and cope; and with the pattern frame between them; Fig. 2 is an end elevation thereof; Fig. 3 is a plan view of the handle of the divided pattern-frame (the latter being partly broken away), the dotted lines showing the fittings on the drag. Fig. 4 is a detached plan view and Fig. 4$^A$ a like view in elevation, of the guiding pin in place in the drag fitting; Fig. 5 is an elevation, detached, of the guiding pin for the pattern frame and the cope fitting and holding lugs for the pattern frame in appropriate relation to each other; Fig. 6 is a plan view, Fig. 7 a longitudinal vertical section and Fig. 8 an end view of one end of the pattern-frame supporting the gate of patterns, and showing the handle of the frame to which the vibrator is attached, and the recess in the frame handle to receive the flask frame. Fig. 9 is a side view, Fig. 10 a plan, and Fig. 11 an end view of an adjustable fitting on the pattern frame, the first two views showing the spring rod by which it is maintained in appropriate relation to the guiding pin on the drag; Fig. 12 is an end elevation, Fig. 13 a plan view and Fig. 14 a sectional side view, of the cope fitting detached; Fig. 15 is an end view, Fig. 16 a plan view, and Fig. 17 a longitudinal section of the adjustable sliding device for the cope fitting, in which the guiding pin of the drag fitting enters; and Fig. 18 is a plan view and Fig. 19 an end view of a lifting handle for the cope fitting employed in lifting the cope from the pattern-frame and drag.

In the drawings (Figs. 1 and 2) there is sufficiently indicated at M the cope and at N the drag of a flask suitable to be operated in a molding machine, and between them is a pattern frame A adapted to support a gate of patterns. The cope M is supplied with a fitting which consists of a bracket handle B secured by screws or otherwise to the exterior of the end wall of the cope (see Fig. 12) with outwardly projecting base plate $B^{10}$, which is cut away at $B^6$ (see Figs. 13 and 14) to provide a clearance for the drag fitting and on either side of this opening $B^6$ are arranged parallel guide ribs $b^7$ $b^7$ to receive between them an adjustable plate B' shown in plan view in Fig. 16 and in section and end views in Figs. 17 and 15. This adjustable plate B' extends through an opening $B^8$ in the bracket B (see Fig. 12), and is cut away centrally as at $B^{11}$ to provide a passageway for the upright guide pin C' (see Fig. 5) of the drag fitting. This plate is also slotted at $B^3$ to enable its more ready adjustment on the bracket plate $B^{10}$. Its opening $B^{11}$ is given a rounded rim flange $B^2$ at the inner end to serve as a guide for the steel pin C' of the drag fitting. A means of more readily lifting the cope from the drag is provided in the bracket plate $B^5$ (shown in plan view Fig. 18 and in front view in Fig. 19) screwed through the bracket B into the cope wall; its relation thereto being shown in Figs. 1 and 2.

The drag N is supplied with a fitting (see Figs. 4 and $4^A$) which consists of a bracket support C screwed to the exterior of the opposite end wall of the drag N and having an outwardly projecting base-plate $C^5$ on which is a socketed upright $C^6$ to support the end of a long upright steel pin C', operating as a guiding pin for the cope. This pin, when the elements are assembled in operative position, passes through the yoke-opening in the handle of the pattern frame and through the openings in the cope fitting and enables the latter to be guided to proper relative position when it is lifted off or on to the pattern frame. The steel pin C' is held in the socketed base by a pin $C^2$. The bracket C has upright stop lugs $C^3$ $C^3$ (see Figs. 4 and $4^A$) which operate to hold the pattern-frame stationary, when the parts are assembled; and said bracket C has also, preferably, a rearwardly projecting deep flange $C^4$ which lies over the edge of the drag and provides a metal surface on that part of the drag N over which the pattern-frame is supported. The relation to each other of these several elements of the drag-fitting is best seen from Fig. 5, and the relation of all of them to the pattern-frame and to the cope fitting is shown in Fig. 1.

For the purpose of maintaining the pattern-frame in appropriate operative alinement with the drag fitting, the yoke-like handle H opposite the projection H' is recessed at $A^{12}$ (see Fig. 6) to receive the spring-supporting and guiding plate A' shown in side elevation in Fig. 9 and in plan view, Fig. 10. The downwardly projecting flange edge $e$ of this plate A' (see Fig. 9) supports a thin flat spring $A^3$, secured to it at $A^5$. At each end of this flat spring is secured an inwardly projecting plate $A^4$ with a concave end $A^2$ corresponding in shape to the guiding pin C' on the drag-fitting (Fig. 10). The said plate A' has a long slotted screw-hole $A^6$ to allow room to shift it in the slot $A^{12}$ of the yoke-handle of the pattern-holding frame and thereby adjust its length of projection into the space formed by the yoke-handle and to and from the guiding pin, thereby increasing or lessening, as the case may be, the tension on said spring.

The operation of the device will be fully understood from the description given; it need only be added that vibration of the pattern-holding frame on its vertically yielding guide pins will produce as well a slight vertical movement of the pattern-frame relatively to the flask elements and a general tremor throughout both sufficient to loosen the pattern in the sand and restricted sufficiently to prevent injuring the sand mold; and that, in consequence of the construction described, the sand-ramming strain is distributed between the pattern and the pattern-frame which supports it; and the impact blow is against a more or less resilient or yielding frame, because it rests to some extent on the sand in the flask, and the natural elasticity of the rebound from such a substance is allowed full play by the provision of the guide pins on the flask elements loosely fitting the holes in the pattern-frame and permitting vertical movement of the latter relatively to the flask elements. These last-mentioned features of my invention accomplish two wholly novel results, marking described advances in the art, namely, avoidance of the usual strain and consequent breaking of the pattern due to the ramming strain; and the production of a perfect sand mold without the provision of any means to provide lateral movement of the pattern-frame relatively to the flask or its supports during the rapping or vibrating of the frame to release the pattern from the sand mold.

Having thus fully described my invention, what I claim as new and desire to secure by Letters Patent of the United States is:

1. In molding apparatus comprising oppositely-disposed flask elements and an interposed pattern-frame, of a fitting for the cope member, consisting of a bracket handle having an outwardly-projecting base-plate which is centrally recessed and provided with a pair of parallel guide-ribs, a fitting for the drag, having a vertically-disposed guide-pin, and connecting means operating as an adjustable guide between said elements, consisting of a plate mounted to slide between said guide ribs of the cope-fitting and having a central opening for the passage of the guide pin of the drag fitting.

2. In molding apparatus comprising oppositely-disposed flask elements and an interposed pattern frame, of a fitting for the drag member of the flask consisting of a bracket support having a basal end projecting outwardly, a socket on the upper face thereof, a vertically-disposed guide pin mounted in said socket, an inwardly projecting flange on the bracket adapted to overlap the edge of the drag member, and vertical lugs on the bracket adapted to coincide with the edge of the pattern frame to hold it in operative register with the flask elements.

3. In molding apparatus comprising oppositely-disposed flask elements and an interposed pattern frame having a yoke-like handle, of a drag-fitting consisting of a bracket support having a vertically-disposed guide pin mounted thereon, a cope-fitting consisting of a bracket having horizontal guiding ribs and a recessed plate slidingly mounted thereon between said ribs, the guide pin of the drag passing through said recess and through the yoke-handle of the pattern frame, and means to yieldingly maintain said pattern frame in operative position relatively to the flask elements.

4. In molding apparatus comprising oppositely-disposed flask elements and an interposed pattern frame having a projecting yoke-like handle, the combination therewith of a fitting for the drag member comprising a bracket support, having a vertically-disposed guide-pin mounted thereon, a fitting for the cope member comprising a bracket support, a recessed guide-plate mounted slidingly thereon, said guide pin extending through the recess of said sliding plate and through the yoke-handle of the pattern-frame, with means to maintain said frame in operative alinement with the drag, consisting of a spring-actuated guiding device mounted midway of its length in the handle of the pattern frame and bearing resiliently against the guide-pin of the drag member.

In testimony whereof, I have hereunto affixed my signature this 15th day of June A. D. 1907.

FREDERICK W. HALL.

Witnesses:
ADA M. BIDDLE,
JAMES STILLMAN.